United States Patent [19]

Suwala

[11] 3,951,853

[45] Apr. 20, 1976

[54] DEFOAMER COMPOSITION
[75] Inventor: David W. Suwala, Flanders, N.J.
[73] Assignee: Diamond Shamrock Corporation, Cleveland, Ohio
[22] Filed: Nov. 4, 1974
[21] Appl. No.: 520,483

[52] U.S. Cl. .............................. 252/321; 252/358
[51] Int. Cl.$^2$ ........................................ B01D 19/04
[58] Field of Search ........................... 252/358, 321

[56]  References Cited
UNITED STATES PATENTS 3,677,963   7/1972   Lichtman et al. .................. 252/358
3,793,223   2/1974   Lichtman et al. .................. 252/358

*Primary Examiner*—Leland A. Sebastian
*Assistant Examiner*—David Leland
*Attorney, Agent, or Firm*—Neal T. Levin; Leslie G. Nunn

[57] ABSTRACT

Compositions for controlling foam in aqueous systems are prepared by dispersing in an organic liquid the particles of an amide with the reaction product of an alkyl or aryl halosilane and a base. Polymers, fatty acids and glycerides may also be present as organic components in the compositions. These compositions do not lose defoaming ability or increase in viscosity after they are heated at elevated temperatures or stored for long periods of time.

17 Claims, No Drawings

DEFOAMER COMPOSITION

BACKGROUND OF THE INVENTION

1. Field of the Invention

This invention relates to compositions which are useful for preventing or destroying foam in aqueous systems and to a method of preparing them.

2. Description of the Prior Art

Water is widely used in various industries as a medium in which materials are temporarily suspended or dissolved during processing. These water slurries or solutions almost always contain surface active compounds either purposely added or as by-products. When such aqueous systems are subsequently subjected to violent agitation, as by mechanical shear, filtering or boiling, they tend to entrain air. The filter washing of pulp slurries in paper mills, the pumping of cement slurries, the shaking of a can of latex paint and the application of an aqueous coating with a roller, blade or brush are some of the more common situations where foam decreases the efficiency of a process and/or produces an unacceptable product.

Dispersions of solid particles in water insoluble organic liquids have been widely used for controlling foam in aqueous systems. Such dispersions usually employed agents to facilitate the spreading of the dispersions at the interface of the aqueous system with air. Anionic, cationic and nonionic surfactants were used for this purpose. These surfactants included such diverse materials as fatty acid soaps, amine salts, polyethylene oxide condensation products, polyethylene glycol esters and silicone oils. These spreading agents, although they increase the cost of a defoamer, often produce undesirable side effects, e.g., a loss of defoaming ability or an increase in viscosity when the defoamer is heated or stored for long periods of time. There is a definite need for defoamer compositions which do not lose defoaming ability or exhibit an increase in viscosity when the defoamer composition is heated at elevated temperatures or stored for long periods of time.

SUMMARY OF THE INVENTION

A defoaming composition is prepared containing from about 75 to about 98 parts by weight of an organic liquid, from about 1 to about 15 parts by weight of small, solid particles of an amide suspended in the organic liquid, from about 0.1 to about 10 parts by weight of a base and from about 0.1 to about 5.0 parts weight of a reactive chlorosilane monomer and from about 0 to about 3 parts weight of an organic component. The amide is a reaction product of a polyamine having at least one alkylene group of 2 to 10 carbon atoms and a fatty acid of 6 to 18 carbon atoms and the organic component is an organic polymer or a fatty acid of 10 to 20 carbon atoms or a glyceride of fatty acids of from 10 to 20 carbon atoms.

This composition is obtained by first preparing a pre-emulsion in an organic liquid by vigorously mixing a solution or a dispersion of the base in an organic liquid with a solution of the reactive chlorosilane. The finely divided amide particles are then dispersed in the pre-emulsion. The amide may be jet-milled to yield the finely divided particles which can simply be mixed into the above pre-emulsion. An alternate process described in U.S. Pat. No. 3,677,963, Lichtman et al, patented July 18, 1972, may be used to produce the small particles of amide in the pre-emulsion. That process when applied to the compositions of this invention involves heating the amide with a viscosity reducing amount of chlorosilane monomer in sufficient organic liquid and from 0 to 3 parts by weight organic component to obtain a uniform homogenous melt and pouring the resulting melt into a cooling liquid, in this case, the preemulsion. The resulting suspension of amide particles may then be homogenized to form an extremely stable dispersion wherein the reaction products of the base and chlorosilane function as dispersing and spreading agents. The composition does not lose defoaming ability or increase in viscosity when it is heated at elevated temperatures or stored for long periods of time.

DESCRIPTION OF PREFERRED EMBODIMENTS

The organic liquid to be used in making the compositions of this invention may be selected from a variety of low cost, readily available hydrocarbon oils and alcohols. Fuel oil, mineral seal oil, paraffin and naphthenic oils are examples of suitable organic liquids. Pure hydrocarbon liquids like cyclohexane, toluene, xylene or dodecane may also be used. The particular organic liquid to be used to make the uniform melt of amide for quick-chilling is one which does not have a boiling point below the melting point of the amide. It is sometimes necessary to dissolve the base for the pre-emulsion in a considerable amount of alcohol and this becomes a part of the organic liquid. Mixtures of two or more of these liquids may be used. The preferred organic liquid is one which will remain fluid over the range of temperatures to which the finished product will be subjected.

Useful amides may be prepared by the reaction of a fatty acid with a primary polyamine. Suitable primary polyamines should have at least two primary amine groups separated by an alkylene group or groups of from two to six carbon atoms, e.g., ethylene diamine, propylene diamine, diethylene triamine, tetraethylene pentamine, hexamethylene diamine and the like. Suitable fatty acids should have from six to eighteen carbon atoms, e.g., hexanoic, lauric, oleic and stearic acids and hydroxylated acids such as ricinoleic acid or naphthenic acids such as are obtained as by-products of petroleum refining. Fatty acid mixtures from natural sources such as tallow, tall or seed oils may be used.

One of the amides useful in this invention is prepared in the following manner. A stainless steel reactor equipped with a condenser, water trap and agitator is charged with 95.7 parts by weight of bleached hydrogenated tallow fatty acids. The entire process is carried out in a nitrogen atmosphere. The acids charge is heated to about 170°C and 10.1 parts by weight of ethylene diamine is added with agitation. After the diamine is added, the reaction mixture is heated to about 182°C and the temperature is maintained until the acid valve of the reaction product is less than 5 mg KOH/g. and the alkalinity is less than 0.6% by weight. The resulting reaction product is then cooled to room temperature. If desired, the cooled mass can be ground to obtain the product in the form of a very fine powder.

The alkyl or aryl halosilanes which may be used to prepare the compositions of this invention include trimethylchlorosilane, dimethyldichlorosilane, methyltrichlorosilane, diphenyldichlorosilane and the like or mixtures of these compounds. These compounds are readily obtainable objects of trade used as intermediates in the production of silicones. They are well characterized and avaiable in high purity.

Bases which react with the halosilanes to form a suitable pre-emulsion may be either organic or inorganic materials. The organic base may be any primary or secondary amine, e.g., diethylamine, ethylene diamine, diethylene triamine, higher polyamines, any of the commercial polyethylenimines, octyl amine, morpholine and mixtures of these amines. These bases may be used neat by dispersing them into a part of the organic liquid medium for the defoamer particles. Other suitable bases include ammonium or alkali metal salts of organic acids, e.g., ammonium stearate, sodium oxalate, sodium carboxy methyl cellulose and the like. A base may also be chosen from the following inorganic bases or basic salts, e.g., ammonia, sodium hydroxide, sodium sulfate, sodium silicate, sodium borate, trisodium phosphate, potassium dichromate and the like. These latter two types of bases should be dissolved in a solvent like water, methanol, t-butanol as needed to promote the reaction of the base with the silane and the rapid formation of a uniform pre-emulsion.

The compositions of this invention may contain optional organic components such as polymers, fatty acids or glycerides of fatty acids. Useful polymers are those which are oil soluble including vinyl acetate copolymers with maleic acid esters, ethylene, propylene and butylene; polyalkylene oxide adducts such as methyl glucoside propoxylated with four moles of propylene oxide; glycerine alkoxylated with fifteen moles of ethylene oxide and forty-five moles of propylene oxide; the copolymer of lauryl methacrylate and vinyl pyrrolidone; methacrylate copolymers dissolved in refined neutral oil; and phenol modified coumaroneindene resins and mixtures of these polymers. Useful fatty acids have from 10 to 20 carbon atoms, e.g., lauric, palmitic, stearic acids and the like. Useful glycerides include any of naturally occurring mixtures of fats of the fatty acids above, e.g., linseed oil, castor oil, lard, tallow and the like and synthetic mono- and diglycerides. It is possible to control the disintegration of the defoamer particles by adding such agents but they must be used cautiously to avoid long term product instability.

The compositions of this invention can be made by first preparing the pre-emulsion. One of the components of the pre-emulsion, either the reactive halosilane or the base, is dissolved or dispersed by mixing vigorously into a part of the organic liquid. The other component of the pre-emulsion dissolved in part of the organic liquid is rapidly added to the mixture with vigorous agitation. Immediately, a milky white, fine-particle-size emulsion begins forming. The particles or droplets in this pre-emulsion are primarily of a complex mixture of copolymers containing methyl silyl groups and the attendent by-product. For example, if ethylene diamine and dimethyldichlorosilane had been selected as the two components of the pre-emulsion, the polymeric and cyclic products that would result include -continued $-(CH_3)_2Si-NH-CH_2CH_2-NH-$ and 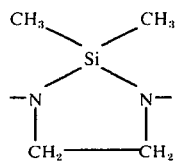

If excess ethylene diamine were charged to the vessel, the dihydrochloride salt would also be formed.

To this pre-emulsion, the secondary amide (having been reduced to a fine particle size by grinding) is added. Alternatively, the process described in U.S. Pat. No. 3,677,963-Lichtman et al, patented July 18, 1972, may be practiced. A mixture of the amide and a part of the organic liquid and polymers, fatty acids and glycerides of fatty acids as desired are raised to a temperature at which a uniform, homogeneous melt is obtained. If desired, a minor portion of the reactive halosilane used, e.g., from 0.01 – 0.5 parts by weight, may be added to the melt mixture to reduce the viscosity of the final product. The fluid melt is poured or pumped as rapidly as possible into the pre-emulsion at a temperature of 30°C or less under vigorous agitation. The droplets of polymer and crystals of by-product salt in the pre-emulsion are especially fine and serve as nuclei for the rapid formation of small crystallites of amide in the practice of the process set forth in U.S. Pat. No. 3,677,963. This pre-emulsion, containing these crystallization nuclei, results in an unexpected improvement in defoamer performance of the amide-type products.

The resulting suspension of amide particles or aggregates thereof is cooled if necessary to about room temperature and then homogenized at between 300 and 4000 p.s.i., preferably at from 300 to 2000 p.s.i., in a production homogenizer such as the Gaulin homogenizer.

After homogenization, the reaction products of the halosilane and base act to stabilize the viscosity of the defoaming agent and possibly act as a spreading agent. Silicone oil is not required. Miscible organic liquids and emulsifiers may be mixed with the compositions of this invention as needed for the particular aqueous system to be defoamed.

A small amount of the composition of this invention is required to control foam in an aqueous system. In the continuous filter washing of pulp in a Kraft mill, where a considerable amount of black liquor containing defoamer is recycled to the washers, as little as 100 cc per minute added to a 1000 gal/min brownstock flow can maintain foam at manageable levels. In formulating a latex paint, as much as 6.0 lbs. may have to be added to 100 gallons of the paint to achieve satisfactory foam suppression. The exact amount of defoamer that will be needed will depend upon the amount of surfactant which is present in the particular aqueous system being defoamed.

Defoamer compositions for use in paper mills are evaluated in a test apparatus designed to simulate conditions in the filter washing system of a Kraft pulp mill. The test apparatus is a 1000 ml tall form beaker with a curved outlet tube attached to the bottom. A centrifugal pump draws the test liquid from the curved outlet tube and pumps it back into the beaker through a stainless steel nozzle. The pumping rate is adjusted with a variable transformer so that a test is complete in a reasonable length of time, in this case, about 2 minutes.

A steel centimeter scale is mounted on the side of the beaker to permit measurement of the foam height. The zero of this scale is set at the liquid surface when the pump is recirculating a given volume, 500 ml, of a nonfoaming liquid at the test temperature.

A defoamer composition is tested in the apparatus using the following procedure. Five hundred ml of black liquor, usually obtained from a pulp mill, is heated to 75°C and poured into the beaker and the pump started. Foam is allowed to build up to a height of 7.5 cm and 0.1 ml of the defoamer composition is injected with a microliter syringe into the black liquor stream flowing out of the steel nozzle. A stopwatch is started at the instant the defoamer composition is injected. A good defoamer composition will cause the foam to collapse within seconds. Readings of foam height in millimeters are made at 15 second intervals and relatively low numbers are an indication of good performance.

Effectiveness of defoamer compositions in preventing entrained air in latex paints is tested by the following procedure. The weight in pounds of a gallon of the latex paint is determined. An 8 oz. paint can is half-filled with the latex paint and from about 1 to about 6 lb. of the defoamer composition under test per 100 gallon of latex paint is added. The defoamer is mixed into the can of latex paint with a conventional laboratory stirrer for 15 minutes and then the can is agitated for 5 minutes on a mechanical paint shaker. The best defoamer composition for the latex paint is the one which yields the highest weight/gallon latex paint after the shaker test. An indication of the relative stability of a defoamer is obtained by heating the samples of the latex paint to 120°F, holding them at 120°F for 14 days and then retesting by the above procedure.

For a fuller understanding of the nature and objects of this invention, reference may be made to the following examples. These examples are given merely to illustrate the invention and are not to be construed in a limiting sense. All parts, proportions, percentages and other quantities are by weight unless otherwise indicated. The terms oz, °F, °C, mm, cm, ml, lb/gal and cps are used to indicate ounces, degrees Fahrenheit, degrees Centigrade, millimeters, centimeters, milliliters, pounds per gallon and centipoises, respectively, in these examples.

EXAMPLE I

A defoamer composition was prepared using the quantities of ingredients shown in Table I and the ingredients listed in Table II. In Table II, the letter A refers to amide; B refers to base; C refers to organic component; L refers to organic liquid and S refers to reactive silane.

Part A was prepared by mixing the dimethyldichlorosilane (S1) into the 10.0 parts of naphthenic oil (L1). Part B was prepared by dispersing the water glass (B1) into 68.1 parts of naphthenic oil with vigorous and turbulent agitation. A hazy white pre-emulsion was made by adding Part A to Part B with vigorous and turbulent agitation.

Part C was prepared by mixing the stearic diamide of the ethylene diamine (A1), dimethyldichlorosilane and naphthenic oil and heating the mixture to 150°C so that a clear, homogeneous melt was obtained. Part C was "quick-chilled" by pouring it as rapidly as possible into the pre-emulsion under vigorous agitation. The resulting mixture, a suspension of agglomerates, was cooled to less than 35°C and was homogenized twice through a hand-operated homogenizer.

EXAMPLE II

Another defoamer composition shown as Example II in Table I was manufactured according to the following procedure using ethylene diamine (B2) as the base.

Part A was prepared by charging 10.0 parts of paraffinic oil (L-2) to a gate-stirred mixing tank and mixing in the dimethyldichlorosilane. Into a second mixing tank, 68.0 parts of paraffinic oil was charged and the ethylene diamine was added with rapid agitation to form Part B. Part A was then allowed to flow by gravity into the second mixing tank containing Part B under vigorous agitation. The temperature of the resulting pre-emulsion was 35°C after this process and had to be cooled to 30°C.

The ingredients of Part C were then charged to the first mixing tank and the mixture was stirred while heating with steam coils to 150°C until a clear and uniform melt was obtained. Part C was allowed to flow by gravity down into the second tank containing the pre-emulsion under vigorous agitation. An agglomerate suspension was formed by this quick-chilling process. This agglomerate suspension was cooled to 35°C and homogenized at 2000 psi through a Gaulin homogenizer.

EXAMPLE III

A defoamer composition was prepared with a fine particle size diamide of ethylene diamine (A2) for comparison with the defoamers made by the quick-chill process. The diamide was ground to the extent that 99.5% of the powder passes through a 325 mesh screen. Ingredients are shown as Example III in Table I.

Part A was prepared by mixing the dimethyldichlorosilane into 10.0 parts of the paraffinic oil. Ethylene diamine was dispersed into 63.2 parts of the oil under vigorous agitation to form Part B. Part A was added to Part B under vigorous agitation to form a hazy, white pre-emulsion.

Part C was prepared by mixing the powdered diamide with 15.0 parts of the oil. Part C, a paste, was added to the pre-emulsion with vigorous agitation. The resulting suspension was homogenized twice with a hand-operated homogenizer.

EXAMPLE IV

A defoamer composition shown as Example IV in Table I was prepared using an ethanol (L3) solution of ethylene diamine.

The dimethyldichlorosilane was mixed with the oil to form Part A. The ethylene diamine was mixed with the ethanol to form Part B. Part B was added to Part A with vigorous agitation to form a hazy white pre-emulsion.

The ingredients of Part C were heated to 150°C and poured into the pre-emulsion to give the agglomerate suspension which was cooled to less than 35°C and homogenized twice through a hand-operated homogenizer.

EXAMPLE V

A defoamer composition shown as Example V in Table I was prepared as in Example I except that the base in Part B was ethylene diamine, 12-hydroxy stearic diamide of ethylene diamine (A3) was used in Part C and the organic liquid was a paraffinic oil.

EXAMPLE VI

A defoamer composition shown as Example VI in Table I was prepared as in Example V except that Part C also included the organic component, glyceryl trioleate (C1).

EXAMPLE VII

A defoamer composition shown as Example VII in Table I was prepared as in Example IV except that Part B was an isopropanol (L4) solution of ammonium stearate (B3).

EXAMPLE VIII

A defoamer composition shown as Example VIII in Table I was prepared as in Example IV except that the base was potassium hydroxide (B4) and a mixture of two amides was used in Part C. In this case the isopropanol was heated almost to the boil to dissolve the base.

EXAMPLE IX

A defoamer composition shown as Example IX in Table I was prepared as in Example I except that the base was propylene diamine (B5) and the organic liquid was paraffinic oil.

EXAMPLE X

A defoamer composition shown as Example X in Table I was prepared as in Example IV except that Part B was an isopropanol solution of potassium hydroxide and Part C was modified with a tall oil (C2).

EXAMPLE XI

A defoamer composition shown as Example XI in Table I was prepared as in Example I except that a mixture of trimethylchlorosilane (S2) and methyltrichlorosilane (S3) was used in Part A; Part B was a t-alkyl primary amine (B6) in paraffinic oil and Part C was modified with an acrylic ester resin (C3).

EXAMPLE XII

A defoamer composition shown as Example XII in Table I was prepared as in Example I except that Part B was a polyethylenimine (B7) in paraffinic oil. This polymer (mw-600) is composed of units which have two carbons per nitrogen, and these units are randomly distributed in the approximate ratios of one primary amino nitrogen/two secondary amino nitrogens/one tertiary amino nitrogen.

EXAMPLE XIII

A defoamer composition shown as Example XIII in Table I was prepared as in Example I except that Part B was a polyethylenimine (B8) in paraffinic oil. The molecular weight of this polymer was 1800.

EXAMPLE XIV

A defoamer composition shown as Example XIV in Table I was prepared without using the technique of this invention. The ingredients of Part C were heated to 150°C until a homogeneous, clear melt was obtained. Part C was "quick-chilled" by pouring it as rapidly as possible into Part B, in this case the liquid was paraffinic oil, under vigorous agitation. The mixture was cooled to less than 35°C and was passed twice through a hand-operated homogenizer.

TABLE I

DEFOAMER COMPOSITION

| Example | Ingredients of Part A (parts by weight) | Ingredients of Part B (parts by weight) | Ingredients of Part C (parts by weight) |
|---|---|---|---|
| I | 10.0 L1, 1.2 S1 | 68.1 L1, 4.4 B1 | 11.1 L1, 5.2 A1, 0.2 S1 |
| II | 10.0 L2, 1.8 S1 | 68.0 L2, 1.2 B2 | 13.5 L2, 5.2 A1, 0.2 S1 |
| III | 10.0 L2, 2.6 S1 | 63.2 L2, 1.2 B2 | 15.0 L2, 8.0 A2 |
| IV | 68.1 L2, 1.8 S1 | 10.0 L3, 1.2 B2 | 13.5 L2, 5.2 A1, 0.2 S1 |
| V | 10.0 L2, 1.8 S1 | 68.1 L2, 1.2 B2 | 13.7 L2, 4.0 A1, 1.0 A3, 0.2 S1 |
| VI | 10.0 L2, 1.8 S1 | 67.3 L2, 1.2 B2 | 13.5 L2, 4.0 A1, 1.0 A3, 1.0 C1, 0.2 S1 |
| VII | 68.1 L2, 1.8 S1 | 10.0 L4, 1.2 B3 | 13.5 L2, 5.2 A1, 0.2 S1 |
| VIII | 68.5 L2, 1.8 S1 | 10.0 L4, 0.8 B4 | 13.5 L2, 4.2 A1, 1.0 A3, 0.2 S1 |
| IX | 10.0 L2, 1.8 S1 | 68.1 L2, 1.0 B5 | 13.7 L2, 5.2 A1, 0.2 S1 |
| X | 69.8 L2, 0.9 S1 | 10.0 L4, 0.8 B4 | 12.3 L2, 5.0 A1, 1.0 C2, 0.2 S1 |
| XI | 10.0 L2, 0.9 S2, 0.9 S3 | 68.1 L2, 1.2 B6 | 12.5 L2, 5.2 A1, 1.0 C3, 0.2 S1 |
| XII | 10.0 L2, 1.8 S1 | 68.1 L2, 1.2 B7 | 13.5 L2, 5.2 A1, 0.2 S1 |
| XIII | 10.0 L2, 1.8 S1 | 68.1 L2, 1.2 B8 | 13.5 L2, 5.2 A1, 0.2 S1 |
| XIV | | 81.3 L2 | 13.5 L2, 5.2 A1 |

TABLE II

KEY TO INGREDIENTS IN DEFOAMER COMPOSITIONS

A1 - Stearic diamide of ethylene diamine
A2 - Stearic diamide of ethylene diamine, 325 mesh, Glyco Products, Inc.
A3 - 12-hydroxy stearic diamide of ethylene diamine
B1 - Sodium silicate, water glass, $Na_2O/SiO_2$-1/3.22, 38% solids
B2 - Ethylene diamine
B3 - Ammonium stearate paste, 20%
B4 - Potassium hydroxide, 85.7% assay, Baker reagent
B5 - Propylene diamine, Union Carbide
B6 - t-alkyl amine, $C_{12}$ to $C_{14}$, Primene 81R, Rohm and Haas
B7 - Polyethylenimine, PEI 6, Dow
B8 - Polyethylenimine, PEI 18, Dow
C1 - Glyceryl trioleate, Wilson
C2 - Reconstituted tall oil, Unitol CX, Union Camp Corp.
C3 - Copolymer of lauryl methacrylate and vinyl pyrrolidone - Acryloid 953, Rohm & Haas
L1 - Naphthenic oil, Sunthene 410
L2 - Paraffinic oil, Gulf 2210

TABLE II-continued
KEY TO INGREDIENTS IN DEFOAMER COMPOSITIONS

L3 - Ethanol, denatured
L4 - Isopropanol
S1 - Dimethyldichlorosilane
S2 - Trimethylchlorosilane
S3 - Methyltrichlorosilane

EXAMPLE XV

The defoamer compositions of Examples I and II were evaluated as latex paint defoamers using the procedure described above. Samples of the latex paint with four commercial paint defoamers and with no defoamer added were tested for comparison.

TABLE III
HIGH GLOSS WHITE LATEX PAINT DEFOAM TEST

| | amount lb/gal | after 5 min. shake | |
|---|---|---|---|
| | lbs/100 gal | initial | 120°F, 2 wks |
| blank, no shake | 0 | 10.85 | 10.85 |
| defoamer composition of Example I | 6.0 | 9.41 | 9.94 |
| defoamer composition of Example II | 6.0 | 9.15 | 9.70 |
| commercial defoamer W | 6.0 | 9.12 | 8.50 |
| commercial defoamer X | 6.0 | 9.28 | 8.45 |
| commercial defoamer Y | 6.0 | 9.89 | 8.40 |
| commercial defoamer Z | 6.0 | 9.72 | 7.83 |
| blank | 0 | 6.55 | 6.50 |

Clearly, the efficacy of the defoamer compositions of Examples I and II in latex paint as shown in Table III improved upon being heated at 120°F for a period of two weeks. The four commercial defoamers used in the tests all lost defoaming ability upon being heated at 120°F for two weeks. In addition, the dried film of paints containing the defoamer compositions of Examples I and II exhibited high Gardner 60°gloss and unusual freedom from craters and pinholes after this long exposure to heat.

EXAMPLE XVI

The defoamer compositions of Examples II through XIV were tested for defoaming ability in filter washing black liquor as described above.

TABLE IV
BROWNSTOCK DEFOAMING PROPERTIES, INITIAL

| | Foam ht. (mm) at indicated time (sec) | | | | | 60** Σ 0 | Visc. (cps.)* |
|---|---|---|---|---|---|---|---|
| Example | 15 | 30 | 45 | 60 | 90 | | |
| II | 36 | 29 | 34 | 47 | 80 | 146 | 1770 |
| III | 33 | 33 | 45 | 58 | 78 | 169 | 280 |
| IV | 31 | 33 | 39 | 51 | 77 | 154 | 1560 |
| V | 33 | 27 | 32 | 43 | 74 | 135 | 940 |
| VI | 45 | 41 | 41 | 49 | 73 | 176 | 905 |
| VII | 26 | 33 | 41 | 54 | 73 | 154 | 1550 |
| VIII | 27 | 26 | 34 | 45 | 79 | 132 | 2525 |
| IX | 35 | 30 | 36 | 46 | 85 | 147 | 2240 |
| X | 31 | 36 | 46 | 57 | 89 | 170 | 703 |
| XI | 31 | 27 | 30 | 37 | 69 | 125 | 1160 |
| XII | 29 | 27 | 35 | 46 | 81 | 137 | 1468 |
| XIII | 29 | 30 | 37 | 49 | 80 | 145 | 1805 |
| XIV | 44 | 38 | 41 | 50 | 84 | 173 | 8250 |

*Brookfield LVT viscometer, spindle No. 3, 30 rpm
**Summation of the foam heights at the indicated times Of the twelve compositions of Examples II through XIII in Table IV, nine had foam height summations 10% or lower than the composition of Example XIV. Seven of these, Examples II, V, VIII, IX, XI, XII and XIII had foam height sums between 15 and 28% lower than the composition of Example XIV. These significant improvements in defoamer performance resulted from the practice of the techniques of this invention. The compositions of Examples III, VI and X are listed here to demonstrate the low viscosity compositions which can be obtained using the techniques of this invention even though they show poorer defoaming performance. The viscosities of the compositions of Examples II through XIII in Table IV were between 280 and 2525 cps., encompassing a broad range of pumpable consistencies. The composition of Example XIV was so high in viscosity, 8250 cps., that it barely flowed from an upturned beaker. Such a composition would not be practical since it could not be pumped into the aqueous system at a rate sufficient to suppress foam.

TABLE V
BROWNSTOCK DEFOAMING PROPERTIES, 5 HR. AT 50°C

| | Foam ht. (mm) at indicated times (sec) | | | | | 60 Σ 0 | Visc. (cps.) |
|---|---|---|---|---|---|---|---|
| Example | 15 | 30 | 45 | 60 | 90 | | |
| II | 34 | 31 | 36 | 48 | 86 | 149 | 1820 |
| III | 33 | 33 | 40 | 53 | 84 | 159 | 210 |
| IV | 27 | 28 | 36 | 50 | 86 | 141 | 1970 |
| V | 37 | 29 | 31 | 40 | 84 | 137 | 755 |
| VI | 42 | 38 | 35 | 42 | 62 | 157 | 622 |
| VII | 25 | 30 | 41 | 56 | 89 | 152 | 1960 |
| VIII | 25 | 24 | 32 | 44 | 75 | 125 | 2980 |
| IX | 35 | 30 | 34 | 46 | 80 | 145 | 1280 |
| X | 26 | 31 | 39 | 54 | 86 | 150 | 885 |
| XI | 39 | 33 | 39 | 41 | 63 | 152 | 576 |
| XII | 28 | 27 | 34 | 47 | 85 | 136 | 995 |
| XIII | 30 | 29 | 34 | 46 | 81 | 139 | 1340 |
| XIV | 38 | 33 | 36 | 46 | 72 | 153 | stiff gel |

The excellent defoaming of most of the compositions of Examples II through XIII as shown in Table IV is invariant when exposed to 50°C for 5 hrs (Table V). These conditions were chosen to simulate the extreme temperature to which a drum of the defoamer might be subjected if it were stored in direct sunlight in summer. Most of the compositions of Examples II through XIII were considerably better in defoaming ability compared to the composition of Example XIV, which did not have the benefit of the techniques of this invention and which is outside of the scope of this invention. The composition of Example III had defoaming ability almost as good as the other compositions shown in Table IV and V. Note that the composition of Example III required 8.0 parts of the powdered amide to obtain this performance. This shows that the quick-chill process practiced with the techniques of this invention results in a finer size particle than can be obtained by grinding to 325 mesh.

The viscosities of the compositions II through XIII as shown in Table IV were all below 3000 cps and some were below 1000 cps. The viscosity of these compositions is not drastically altered by extended heating as shown in Table V. These characteristics of a defoamer composition, low and constant viscosity, are particularly important in a pulp washing system where defoamers are usually pumped into a continuously flowing stream of brownstock. The composition of Example XIV, made without the technique of this invention, had an initial viscosity of over 8000 cps and thickened to gel when heated for 5 hrs at 50°C.

While the invention has been described with reference to certain specific embodiments thereof, it is understood that it is not to be so limited since alterations and changes may be made therein which are within the full and intended scope of the appended claims.

What is claimed is:

1. A defoamer composition comprising:
   a. from about 75 to about 98 parts by weight of an organic liquid,
   b. from about 1 to about 15 parts by weight of an amide which is a reaction product of a polyamine having at least one alkylene group of 2 to 10 carbon atoms and a fatty acid of from 6 to 18 carbon atoms,
   c. from about 0.1 to about 10 parts by weight of a base,
   d. from about 0.1 to about 5 parts by weight of a reactive chlorosilane monomer, and
   e. from about 0 to about 3 parts by weight of an organic component selected from the groups consisting of an organic polymer, a fatty acid of 10 to 20 carbon atoms and a glyceride of fatty acids of from 10 to 20 carbon atoms.

2. The defoamer composition of claim 1 wherein the organic liquid is selected from the group consisting of fuel oil, mineral seal oil, paraffinic oil, naphthenic oil, cyclohexane, xylene, toluene and dodecane.

3. The defoamer composition of claim 1 wherein the amide is the reaction product of a polyamine selected from the group consisting of ethylene diamine, butylene diamine, diethylene triamine, triethylene tetramine, hexamethylene diamine, decamethylene diamine, hydroxyethyl ethylene diamine, and 1:3-diamino-2-propanol, and a fatty acid selected from the group consisting of hexanoic acid, decanoic acid, lauric acid, palmitic acid, oleic acid, stearic acid, ricinoleic acid, naphthenic acids, tall oil acid, tallow fatty acid, and hydrogenated tallow fatty acid.

4. The defoamer composition of claim 1 wherein the base is selected from the group consisting of a primary amine, secondary amine, polyamine having from 1 to 6 carbon atoms for each nitrogen atom, ammonium salts of organic acids having from 1 to 20 carbon atoms, alkali metal salts of organic acids having from 1 to 20 carbon atoms, ammonia, sodium hydroxide, sodium sulfate, sodium silicate, sodium borate, trisodium phosphate and potassium dichromate.

5. The defoamer composition of claim 1 wherein the reactive chlorosilane monomer is selected from the group consisting of trimethylchlorosilane, dimethyldichlorosilane, methyltrichlorosilane, diphenyldichlorosilane and mixtures of these compounds.

6. The defoamer composition of claim 1 wherein the organic component is selected from the group consisting of copolymer of vinyl acetate and fumaric acid esterified with a tallow alcohol, copolymer of vinyl acetate with maleic acid esters, copolymer of vinyl acetate with ethylene, copolymer of vinyl acetate with propylene, copolymer of vinyl acetate with butylene, ethyl glucoside alkoxylated with four moles of propylene oxide, glycerine alkoxylated with fifteen moles of ethylene oxide and forty-five moles of propylene oxide, copolymer of lauryl methacrylate and vinyl pyrrolidone, methacrylate copolymer dissolved in refined oil, blown hydrogenated soya oil, blown vegetable oil, blown castor oil, soya alkyd, phenol modified coumarone indene resin, glycerol ester of gum rosin, glycerine ester of polyvinylpryrolidone, lauric acid, palmitic acid, stearic acid, linseed oil, castor oil, lard and tallow.

7. The defoamer composition of claim 1 wherein the organic liquid (a) is paraffinic oil, the amide (b) is stearic diamide of ethylene diamine, the base (c) is ethylene diamine and the chlorosilane monomer (d) is dimethyldichlorosilane.

8. The defoamer composition of claim 1 wherein the organic liquid (a) is paraffinic oil, the amide (b) is stearic diamide of ethylene diamine, the base (c) is potassium hydroxide and the chlorosilane monomer (d) is dimethyldichlorosilane.

9. The defoamer composition of claim 1 wherein the organic liquid (a) is paraffinic oil, the amide (b) is stearic diamide of ethylene diamine, the base (c) is t-alkylamine and the chlorosilane monomer (d) is methyltrichlorosilane.

10. The defoamer composition of claim 1 wherein the organic liquid (a) is paraffinic oil, the amide (b) is stearic diamide of ethylene diamine, the base (c) is t-alkylamine and the chlorosilane monomer (d) is trimethylchlorosilane.

11. The defoamer composition of claim 1 wherein the organic liquid (a) is paraffinic oil, the amide (b) is stearic diamide of ethylene diamine, the base (c) is polyethylenimine and the chlorosilane monomer (d) is dimethyldichlorosilane.

12. The defoamer composition of claim 1 wherein the organic liquid (a) is naphthenic oil, the amide (b) is stearic diamide of ethylene diamine, the base (c) is sodium silicate and the chlorosilane monomer (d) is dimethyldichlorosilane.

13. A method of preparing the defoamer composition of claim 1 comprising the steps of
   a. forming a pre-emulsion by:
      1. mixing the chlorosilane monomer in the organic liquid and then adding the base, or
      2. mixing the base in the organic liquid and then adding the chlorosilane monomer,
   b. dispersing the amide in the defoamer composition by
      1. heating the amide with a viscosity reducing amount of chlorosilane monomer in sufficient organic liquid to obtain a pumpable defoamer composition and from 0 to about 3 parts by weight of the organic component to obtain a uniform homogeneous melt, cooling the pre-emulsion to a temperature sufficient to hold the temperature of the pre-emulsion below the softening point of the amide after the melt is added to the pre-emulsion, and then adding the melt to the cooled pre-emulsion to form a dispersion of the amide in the defoamer composition,
      2. adding finely divided amide and from 0 to about 3% by weight of the organic component to the pre-emulsion to form a dispersion of the amide in the defoamer composition, and thereafter,
   c. homogenizing the defoamer composition to suspend the amide particles in the defoamer composition.

14. The process of claim 13 wherein the portion of chlorosilane monomer with the amide in (b) is from about 0.01 to about 0.5 parts by weight.

15. A method of defoaming an aqueous system which comprises adding to the aqueous system a foam controlling amount of the defoamer composition of claim 1.

16. The method of claim 15 wherein the aqueous system is a paper making process.

17. The method of claim 15 wherein the aqueous system is a latex paint.

* * * * *

UNITED STATES PATENT AND TRADEMARK OFFICE
CERTIFICATE OF CORRECTION

PATENT NO. : 3,951,853
DATED : April 20, 1976
INVENTOR(S) : David W. Suwala

It is certified that error appears in the above-identified patent and that said Letters Patent are hereby corrected as shown below:

Column 11, claim 6, line 67, change "ethyl" to --methyl--. Column 12, claim 13, line 59, after "comma (,)" add --or--.

*Signed and Sealed this*

Thirtieth *Day of* November 1976

[SEAL]

*Attest:*

RUTH C. MASON
*Attesting Officer*

C. MARSHALL DANN
*Commissioner of Patents and Trademarks*